April 28, 1942. W. R. WICKERHAM ET AL 2,280,991
MOTOR CONTROL SYSTEM
Filed July 29, 1941 3 Sheets-Sheet 1

WITNESSES:
E. A. McCloskey
Nw. C. Groome

INVENTORS
William R. Wickerham
and James E. Borland.
BY
Paul E. Friedemann
ATTORNEY April 28, 1942.  W. R. WICKERHAM ET AL  2,280,991
MOTOR CONTROL SYSTEM
Filed July 29, 1941  3 Sheets-Sheet 3

Lowering Regenerative Speed Motor
Delivering 100% Torque.

WITNESSES:
E. A. McCloskey
Wm. C. Groome

INVENTORS
William R. Wickerham
and James E. Borland.
BY
Paul E. Friedemann
ATTORNEY Patented Apr. 28, 1942

2,280,991

UNITED STATES PATENT OFFICE 2,280,991

MOTOR CONTROL SYSTEM

William R. Wickerham, Swissvale, and James E. Borland, Wilkinsburg, Pa., assignors to Westinghouse Electric & Manufacturing Company, East Pittsburgh, Pa., a corporation of Pennsylvania Application July 29, 1941, Serial No. 404,498

11 Claims. (Cl. 172—179)

Our invention relates to motor control systems, and more particularly to systems of control for effecting dynamic braking of induction motors.

In skip hoists and many mine hoists the ore bucket, often full, is lowered over a track having a varying slope so that the danger of excess overhauling speeds is ever present. The aim in most cases is to operate the orebucket, both for lowering and hoisting, at the maximum speed, but if an overhauling load to be lowered at a high speed, the braking has to be adjusted to a low value which naturally is an adjustment in the dangerous direction. The speed may become excessive thus causing serious accidents and wrecking valuable equipment.

One broad object of our invention is to make the dynamic braking torque of an induction motor rise with the braking current.

Another object of our invention is to increase the braking effect on wound rotor induction motors, that is being driven by an overhauling load, out of proportion with the rise in braking current in the secondary winding.

It is also an object of our invention to so control the dynamic braking effect of a wound rotor induction motor that the braking effect changes nearly proportional, but at a relatively low rate, to the braking current in the induction motor secondary up to a certain value of secondary current, and for any secondary current greater than said certain value to control the dynamic braking effect so that it changes nearly proportional, but at a considerably higher rate, to the braking current in the motor secondary, whereby the motor speed is prevented from rising any material extent above a given value.

A further broad object of our invention is to electrically prevent any material rise in motor speed above a given value of a motor operated by an overhauling load.

The objects hereinbefore stated are merely illustrative of our many other objects, which many other objects will, no doubt, become more apparent from a study of the following specification and the appended claims and the drawings forming part of this disclosure.

Figure 1:
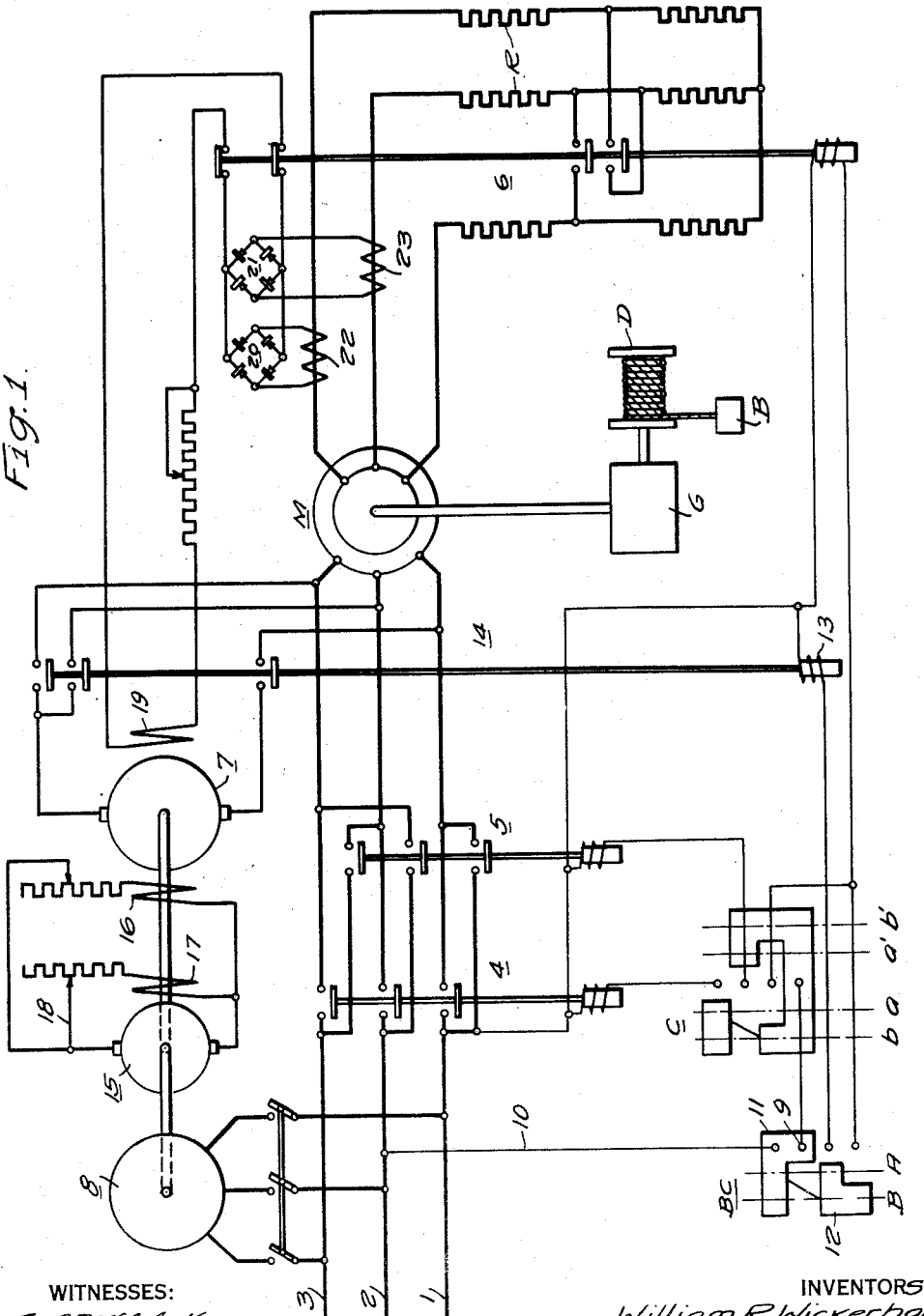
Figure 1 is a diagrammatic showing of one embodiment of our invention.
Figure 2:
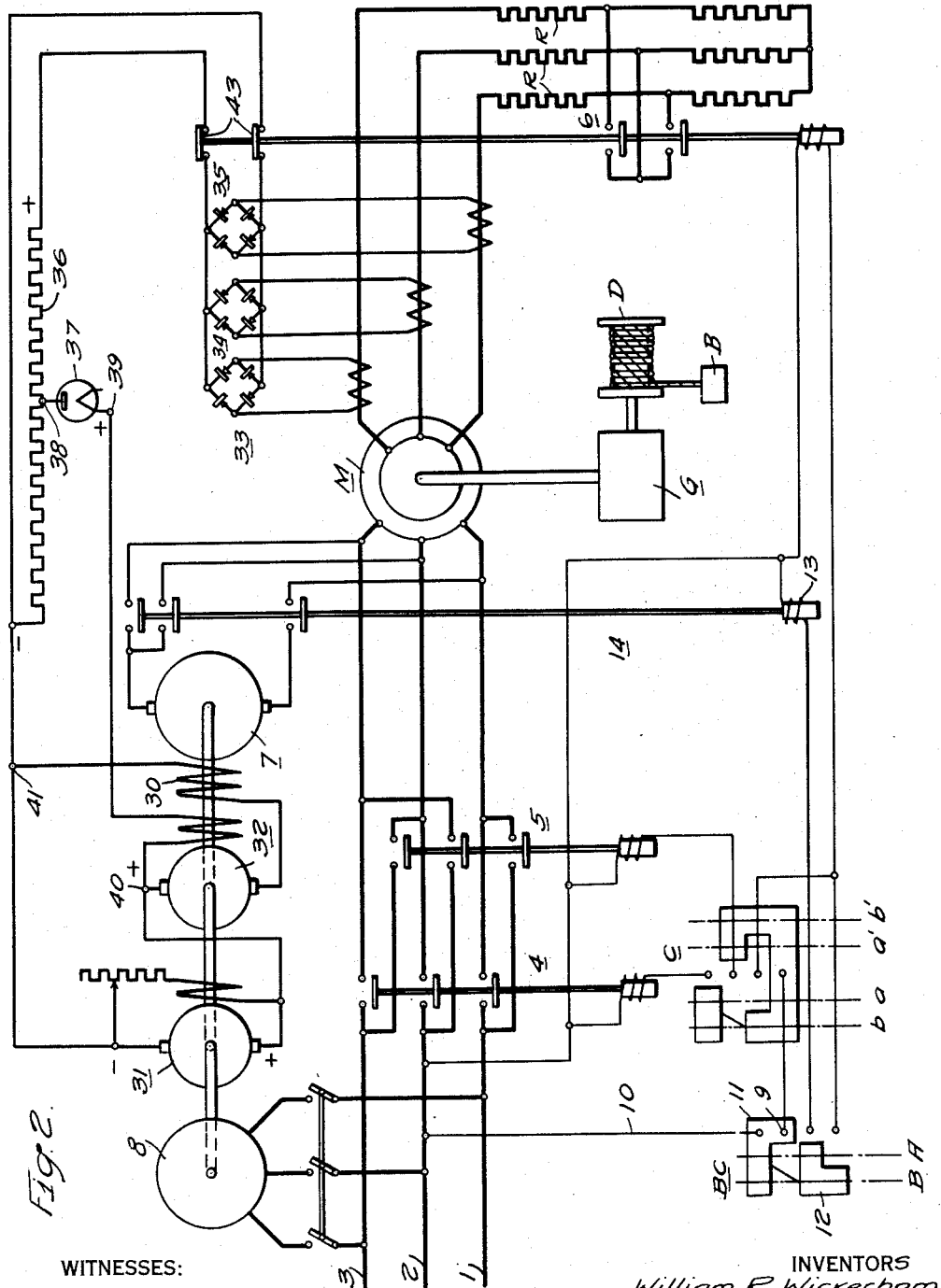
Fig. 2 is a diagrammatic showing of another and preferred embodiment of our invention.

In Figs. 1 and 2, the main wound rotor induction motor M is shown coupled through a reduction gear G, to a reel drum D for operating the ore bucket B. This ore bucket may run on tracks (not shown) having various slopes over its entire length so that the motor M is subjected to a varying load.

The motor primary is supplied with alternating current from buses 1, 2 and 3 through either of the reversing contactors 4 and 5. These contactors 4 and 5 are caused to operate by suitable manipulation of the master controller C so that the motor M may operate in either the forward direction or reverse direction.

The motor secondary includes a considerable number of resistor sections R so that the speed and torque of the motor may be varied over a wide range. We have shown only two sections for the sake of simplicity and clarity of the disclosure. In practice, the controller C may be provided with as many as eleven, or more, points $a$, $b$, $c$, etc., or $a'$, $b'$, $c'$, etc., for controlling eleven, or more, resistor shunting contactors as 6. Since such wound rotor induction motor control is well known and in itself constitutes no part of our invention, no further description need be given.

To provide suitable dynamic braking for the motor, we provide a direct current generator 7 coupled to a constant speed motor 8. This constant speed motor may be driven from any suitable source, but, as shown, may be connected to buses 1, 2, and 3. To effect dynamic braking, we provide the dynamic braking controller BC.

When the controller is moved from its off position to any one of its operating positions, $a$, $b$, $c$, etc., the current supply for controller BC is interrupted at contact finger 9 to thus disconnect the motor M from the buses 1, 2 and 3. The controller BC has as many braking positions as controller C has speed positions. In fact, the resistor shunting contactors 6 during braking may be controlled similar to the speed control from controller C. We show only the one resistor shunting contactor 6 for the sake of facilitating the disclosure of the invention.

Operation of controller BC to the $a$ position establishes a circuit from bus 2 through conductor 10, controller segments 11 and 12, coil 13 of dynamic braking contactor 14. Operation of contactor 14 supplies the primary of motor M with direct current from generator 7 to thus effect dynamic braking for the ore bucket B. All the subject matter thus far described is well known in the art, but such prior art arrangement, while providing dynamic braking, does not provide for such dynamic braking as to prevent run-away overhauling speeds, nor provide a dynamic braking that does not impair maximum allowable speed of operation.

In Fig. 1, we provide an adjustable voltage self-excited exciter 15 for supplying a constant excitation, for any given adjustment, to the field winding 16 of the generator 7. This arrangement has considerable advantage over direct control of the voltage of generator 7 because the direct-current flowing in the motor primary, or stator can be readily controlled by controlling the relatively small currents flowing in the exciter field 17. This, in practice, permits the use of small and inexpensive contactors for varying the exciter excitation and rheostatic losses are eliminated or reduced to a small value in the circuit for the field 16. We do not show a plurality of small contactors but for simplicity show a rheostat arm 18.

Since the torque demand varies considerably as different track slopes are traversed by the ore bucket, the speed of the bucket will tend to vary over a wide range. To make the excitation of generator 7 responsive to speed, geared limit switches have been proposed, but such switches are complicated, present a high maintenance cost, and are not near as reliable as some more direct electrical means of controlling the voltage of generator 7.

With our scheme we make the motor stator excitation a function of the torque demand, that is, an increase in torque demand increases the stator excitation. In our scheme, as shown in Fig. 1, we provide generator 7 with an additional field winding 19. The field winding 16 is energized at a constant strength, sufficient to supply the excitation necessary for the minimum dynamic braking torque required, and the field winding 19 is excited through the rectifiers 20 and 21 from the current transformers 22 and 23, respectively, disposed in two of the phases of the motor secondary winding.

The generator 7 is, of course, selected of sufficient capacity that the excitation, even when both fields 16 and 19 are excited a maximum, in operation, is not carried materially above the knee of the saturation curve of generator 7. This means that for changes of braking current in the secondary of the motor, a desirable braking control for many applications may be obtained. The speed torque characteristic for the scheme shown in Fig. 1 is illustrated by curve $x$ of Fig. 4.

It will be noted from this curve that the maximum speed is not very materially limited. Though the scheme of Fig. 1 is of value for many applications, it does not provide maximum protection and may for some applications be far from being safe. We have, therefore, also devised the scheme shown in Fig. 2.

With the arrangement shown in Fig. 2, we provide the generator 7 with but one field 30. This field 30 is connected to be energized from the self-excited adjustable voltage exciter 31 and under certain conditions from the booster exciter 32 and the current in the secondary winding of motor M.

The scheme shown in Fig. 2 comprises a unique full automatic method of applying the braking torque. With this scheme the braking torque, when above a certain value, is made responsive, in amplified manner, to the value of the lowering load above a certain minimum value. Besides guaranteeing that the maximum braking torque will always be well in excess of that required by the load, this method subjects the stator motor windings to a minimum of heating, since the most efficient combination of excitation and secondary resistance is used for all conditions.

The operation is as follows: Movement of controller BC to the $a$ or maximum speed position, disconnects the primary or stator of motor M from the buses 1, 2 and 3, and, through operation of contactor 14, connects the stator to the direct current generator 7. The braking current flowing in the secondary is rectified through full-wave rectifiers 33, 34 and 35, and a voltage proportional to this braking current is impressed across the resistor.

An electric valve 37 is connected to the resistor 36 at a suitable point. This electric valve may be a thermionic rectifier, a copper oxide rectifier, or any other suitable rectifier, as long as it permits a current flow from the junction 38 of resistor 36 toward junction 39 but not in the reverse direction.

The exciter 31 is connected in a closed circuit as follows: From positive junction 40, through the armature of booster exciter 32, field winding 30, to the negative junction 41. The voltage of exciter 31 is fixed, at some adjusted value, and the adjustment may be such as to provide for a maximum braking torque of about 70% normal at say, 3600 feet per minute of cable speed. The voltage of the booster exciter is responsive to the motor rotor load amperes, and, for the arrangement we show, is zero for any motor load current under that corresponding to 70% of full load torque at 3600 feet per minute of cable speed. When the rotor current rises above this value due to a slight rise in speed above the 3600 feet per minute rope speed, the output voltage of exciter 32 rises very rapidly resulting in a sharp rise in stator excitation.

Figure 3:
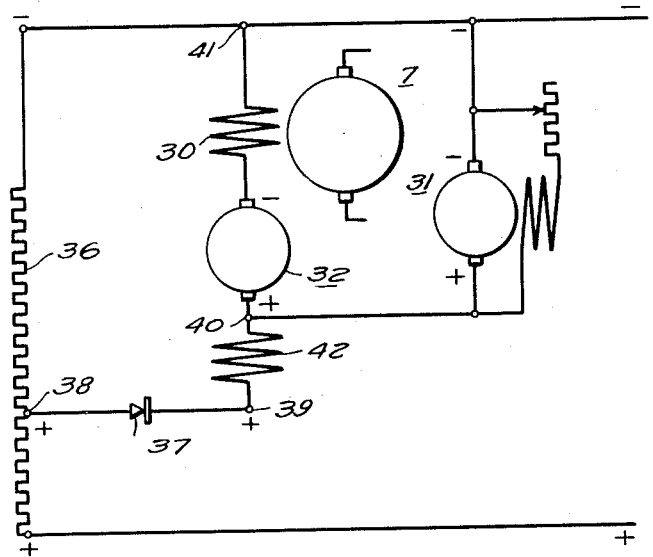
Fig. 3 is a simplified diagrammatic showing of the subject matter of Fig. 2.

How this is accomplished will be more apparent from Fig. 3. The exciter 31 makes junction 40 positive and for all speeds of less than 3600 feet per minute, cable speed junction 39 is positive at a value less than the positive potential at 40. Valve 37, however, prevents any current from flowing through field 42 from junction 40 toward junction 39. For a slight rise of speed above the critical selected junction 40 becomes negative with reference to junction 39. The result is that current begins to flow from junction 38, through valve 37, through field 42, the armature of exciter 32 and field 30 to junction 41. Since the field 42 is now excited, the voltage of exciter 32 builds up rapidly in the direction to aid exciter 31. The result is a very rapid rise of the voltage of generator 7.

Figure 4:
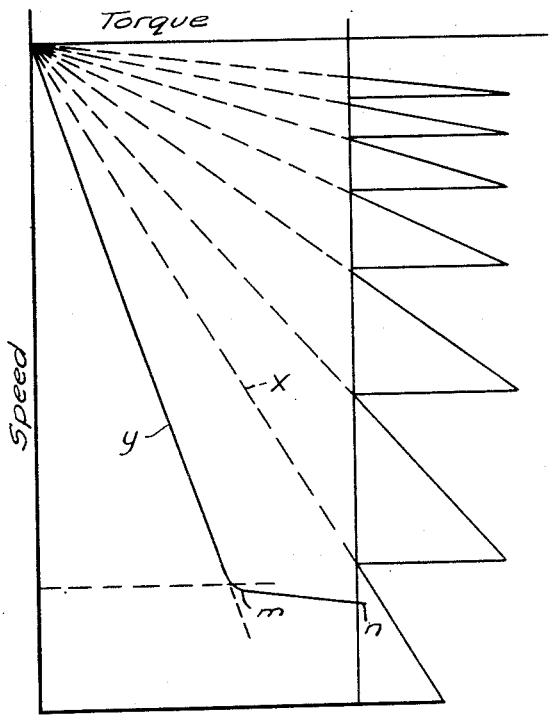
Fig. 4 shows some curves illustrating the advantageous operating characteristics of our invention.

By referring to curve $y$ shown in Fig. 4 it will be noted that on the $a$ position of the controller BC, a value of secondary resistance is selected which will permit a cable speed of about 3600 feet per minute at 70% motor torque, this torque being selected to correspond to that required to lower a loaded skip, or one bucket, where the slope is a minimum.

As the cable speed rises above the critical selected value, the braking torque, as shown by curve $y$ from point $m$ to point $n$, rises very rapidly. The net result is that the lowering cable speed is maintained substantially constant at the 3600 feet per minute, even though there be wide fluctuations in torque, caused by changes in track slope profile.

Movement of the controller BC to the $b$ position energizes contactor 6. The operation of this contactor opens the circuit for the automatic amplifying feature at contact members 43 and also changes to secondary resistance so that the torque is increased and the motor speed materially reduced. Curve $x$, Fig. 4, shows this speed torque feature.

The two control schemes are merely illustrative of our invention, and this is also true of specific values of speed, torque, etc., mentioned.

We do not wish to be limited to the particular showings made, but believe no other limitations than those required by the scope of the appended claims should be applied.

We claim as our invention:

1. In a system of control for effecting dynamic braking of an induction motor, in combination, said motor having primary windings and secondary windings, a wound rotor induction motor, a source of alternating current, means for connecting the motor to the source of alternating current, a source of direct current, means for connecting the motor to the source of direct current, control means for substantially simultaneously disconnecting the motor from the source of alternating current and for connecting the motor to the source of direct current, and means interconnected with the secondary winding for electrically changing the voltage of the source of direct current as a function of the braking current in the secondary winding.

2. In a system of control for effecting dynamic braking of a wound rotor induction motor, in combination, a wound rotor induction motor having a primary winding and a secondary winding, a source of alternating current, means for connecting the primary winding to the source of alternating current, a source of direct current, means for connecting the primary winding to the source of direct current to effect dynamic braking when the motor is driven by an overhauling load, a controller for disconnecting the primary winding from the source of alternating current and for connecting the source of direct current to the primary winding, current transformer means connected in the secondary winding, current rectifying means connected to the current transformer, means for interconnecting the current rectifying means with the source of direct current so as to alter the voltage of the source of direct current with changes in secondary current.

3. In a system of control for effecting dynamic braking of a wound rotor induction motor, in combination, a wound rotor induction motor having a primary winding and a second winding, a source of alternating current, means for connecting the primary winding to the source of alternating current, a source of direct current, means for connecting the primary winding to the source of direct current to effect dynamic braking when the motor is driven by an overhauling load, a controller for disconnecting the primary winding from the source of alternating current and for connecting the source of direct current to the primary winding, said source of direct current comprising a suitably operated main generator, an exciter, and a booster exciter, said main generator having a field winding connected in a closed circuit including the positive terminal of the exciter, the negative terminal of the booster exciter, the armature of the booster exciter, the field winding of the main generator to the negative terminal of the exciter, a potentiometer resistor, means for subjecting the resistor to a voltage proportional to the varying currents in the motor secondary winding, said resistor having its negative junction in common with the negative terminal of the exciter, an electric valve, a field winding for the booster exciter, a circuit including the common negative junction of exciter and resistor, a portion of the resistor, the electric valve, the field winding of the booster exciter, said valve being connected to permit current to flow from the resistor toward the field of the booster exciter, the positive, common and negative junction of the exciter and the booster exciter, respectively, the armature of the booster exciter, the field winding of the main generator to the common negative junction of exciter and resistor, whereby current will flow through the booster exciter field when the potential across the resistor rises above a certain value.

4. In a system of control for effecting dynamic braking of a wound rotor induction motor, in combination, a wound rotor induction motor having a primary winding and a secondary winding, a source of alternating current, means for connecting the primary winding to the source of alternating current, a source of direct current, means for connecting the primary winding to the source of direct current to effect dynamic braking when the motor is driven by an overhauling load, a controller for disconnecting the primary winding from the source of alternating current and for connecting the source of direct current to the primary winding, transformer means connected in the circuit of the secondary winding, rectifier means connected to the transformer means, electric control means for controlling the voltage of said source of direct current, said electric control means including electric valve means interconnected with said rectifying means and control means to abruptly alter the voltage of the source of direct current when the valve of the current from said rectifying means attains a certain value.

5. In a system of control for effecting dynamic braking of a wound rotor induction motor, in combination, a wound rotor induction motor having a primary winding and a secondary winding, a source of alternating current, means for connecting the primary winding to the source of alternating current, a source of direct current, means for connecting the primary winding to the source of direct current to effect dynamic braking when the motor is driven by an overhauling load, a controller for disconnecting the primary winding from the source of alternating current and for connecting the source of direct current to the primary winding, said source of direct current including a main generator having armature and field windings, an exciter, and voltage control means responsive to the value of the current flowing in the secondary winding of the wound rotor induction motor, said field windings of the main generator being connected to be energized by said exciter and the said voltage control means.

6. In a system of control for effecting dynamic braking of a wound rotor induction motor, in combination, a wound rotor induction motor having a primary winding and a secondary winding, a source of alternating current, means for connecting the primary winding to the source of alternating current, a source of direct current, means for connecting the primary winding to the source of direct current to effect dynamic braking when the motor is driven by an overhauling load, a controller for disconnecting the primary winding from the source of alternating current and for connecting the source of direct current to the primary winding, said source of direct current comprising a constant voltage exciter, a main generator having two field windings one of said windings being connected to be energized by the exciter and the other field winding being energized, cumulatively to the first field winding, as a function of the current traversing the secondary winding of the wound rotor induction motor.

7. In a system of control for effecting dynamic braking of a wound rotor induction motor, in combination, a wound rotor induction motor having a primary winding and a secondary winding, a source of alternating current, means for connecting the primary winding to the source of alternating current, a source of direct current, means for connecting the primary winding to the source of direct current to effect dynamic braking whe the motor is driven by an overhauling load, a controller for disconnecting the primary winding from the source of alternating current and for connecting the source of direct current to the primary winding, said source of direct current comprising a suitably operated main generator and an exciter, and means for exciting the main generator as a function of the voltage of the exciter and the current traversing the secondary winding.

8. In a system of control for effecting dynamic braking of a wound rotor induction motor, in combination, a wound rotor induction motor having a primary winding and a secondary winding, a source of alternating current, switching means for connecting the primary winding to the source of alternating current, a source of direct current, switching means for connecting the primary winding to the source of direct current to effect dynamic braking when the motor is driven by an overhauling load, a controller effecting the operation of said switching means for disconnecting the primary winding from the source of alternating current and for connecting the source of direct current to the primary winding, said source of direct current including a main direct current generator having armature windings and field windings, an exciter having armature windings and field windings, transformer means connected to be energized in proportion to the current traversing the secondary winding, rectifier means connected to said transformer to produce a direct current potential proportional to the value of the current in the secondary winding, circuit means for interconnecting the field winding of said main direct current generator to the exciter terminal and the direct current potential of said rectifying means.

9. In a system of control for effecting dynamic braking of a wound rotor induction motor, in combination, a wound rotor induction motor having a primary winding and a secondary winding, a source of alternating current, switching means for connecting the primary winding to the source of alternating current, a source of direct current, switching means for connecting the primary winding to the source of direct current to effect dynamic braking when the motor is driven by an overhauling load, a controller effecting the operation of said switching means for disconnecting the primary winding from the source of alternating current and for connecting the source of direct current to the primary winding, said source of direct current including a main direct current generator having armature windings and field windings, an exciter having armature windings and field windings, transformer means connected to be energized in proportion to the current traversing the secondary winding, rectifier means connected to said transformer to produce a direct current potential proportional to the value of the current in the secondary winding, circuit means interconnecting the field windings of the main direct current generator to be energized from the exciter and the direct current potential of the rectifying means.

10. In a system of control for effecting dynamic braking of a wound rotor induction motor, in combination, a wound rotor induction motor having a primary winding and a secondary winding, a source of alternating current, switching means for connecting the primary winding to the source of alternating current, a source of direct current, switching means for connecting the primary winding to the source of direct current to effect dynamic braking when the motor is driven by an overhauling load, a controller effecting the operation of said switching means for disconnecting the primary winding from the source of alternating current and for connecting the source of direct current to the primary winding, said source of direct current including a main direct current generator having armature windings and field windings, a main exciter having armature windings and field windings, transformer means connected to be energized in proportion to the current traversing the secondary winding, rectifier means connected to said transformer to produce a direct current potential proportional to the value of the current in the secondary winding, a booster exciter having armature windings and field windings connected to the main exciter, an electric valve so interconnected with the direct current potential of the rectifying means and the field winding of the booster exciter that the field winding of the booster exciter is energized only when the direct current potential of the rectifying means rises above the voltage of the main exciter.

11. In a system of control for effecting dynamic braking of a wound rotor induction motor, in combination, a wound rotor induction motor having a primary winding and a secondary winding, a source of alternating current, switching means for connecting the primary winding to the source of alternating current, a source of direct current, switching means for connecting the primary winding to the source of direct current to effect dynamic braking when the motor is driven by an overhauling load, a controller effecting the operation of said switching means for disconnecting the primary winding from the source of alternating current and for connecting the source of direct current to the primary winding, said source of direct current including a main direct current generator having armature windings and field windings, a main exciter having armature windings and field windings, transformer means connected to be energized in proportion to the current traversing the secondary winding, rectifier means connected to said transformer to produce a direct current potential proportional to the value of the current in the secondary winding, a booster exciter having armature windings and field windings connected to the main exciter, an electric valve so interconnected with the direct current potential of the rectifying means and the field winding of the booster exciter that the field winding of the booster exciter is energized only when the direct current potential of the rectifying means rises above the voltage of the main exciter, and means for substantially simultaneously making said transformer means, said rectifying means ineffective and for altering the resistance value of the secondary winding.

WILLIAM R. WICKERHAM.
JAMES E. BORLAND.